United States Patent [19]
Spitz et al.

[11] 4,419,598
[45] Dec. 6, 1983

[54] PIEZOELECTRICALLY CONTROLLED PIEZORESISTOR

[75] Inventors: Erich Spitz; François Micheron, both of Paris, France

[73] Assignee: Thomson-CSF, Paris, France

[21] Appl. No.: 331,130

[22] Filed: Dec. 15, 1981

[30] Foreign Application Priority Data

Dec. 15, 1980 [FR] France ................................. 80 26543

[51] Int. Cl.$^3$ ........................................... H01L 41/08
[52] U.S. Cl. ..................................... 310/311; 310/328; 310/329; 310/800
[58] Field of Search ................ 310/311, 338, 317–319, 310/329, 800, 328; 338/2, 3, 5; 357/26; 73/774, 777, 782

[56] References Cited

U.S. PATENT DOCUMENTS

| | | | |
|---|---|---|---|
| 2,331,617 | 10/1943 | Moore, Jr. ..................... | 310/311 X |
| 3,283,590 | 11/1966 | Shang ............................. | 310/329 X |
| 3,417,322 | 12/1968 | Fenner ........................... | 310/318 X |
| 3,492,513 | 1/1970 | Hollander, Jr. et al. ....... | 310/311 X |
| 3,739,201 | 6/1973 | Adler et al. ..................... | 310/318 X |
| 3,805,601 | 4/1974 | Jeffers ............................ | 310/311 X |

*Primary Examiner*—Mark O. Budd
*Attorney, Agent, or Firm*—Oblon, Fisher, Spivak, McClelland & Maier

[57] ABSTRACT

Electrically piezoresistor produced by means of a piezoresistive element coupled to an electromechanical transducer, whose terminals are the input terminals of the piezoresistor. The piezoresistor comprises thermal drift compensating means.

13 Claims, 14 Drawing Figures

PIEZOELECTRICALLY CONTROLLED PIEZORESISTOR

BACKGROUND OF THE INVENTION

The present invention relates to an electrically controlled piezoresistor.

The present invention relates to electrically controlled resistors. The best known devices of this type are transistors, electron tubes and relays. In the first two cases, the geometrical space of the rheostat is populated to a greater or lesser extent by an electric charge carrier, whose number is electrically controlled in the control space, whereas in the third case an electric contact is opened or closed by an electromechanical device. The first two devices permit an analogous control of the rheostat, whereas the latter only permits a quantified control.

The device according to the present invention is linked with relays due to the fact that the resistance is controlled by an electromechanical process and is linked with transistors and tubes due to the fact that the resistance can be continuously changed. Thus, it offers the advantage in the case of a control associated with a partial movement of the power device that it can be directly used in a display system because movements can be utilized to modulate a light beam by variable reflection or transmission.

Thus, it comprises a rheostat under the action of a mechanical stress of deformation, which is mechanically coupled to an electromechanical device able to apply a deformation such that its resistance is dependent on the voltage applied to the electromechanical device, means making it possible to compensate the thermal drift.

BRIEF SUMMARY OF THE INVENTION

The present invention therefore relates to an electrically controlled piezoresistor having at least one piezoresistive element made from a conductive particle-charged dielectric material and having one percolation point and a pair of input terminals, and at least one electromechanical transducer connected at its input terminals to an electrical controlled signal and acting on the piezoresistive element via a transmitter element made from a dielectric material, and a device for compensating the thermal drift due to the piezoresistive element cooperating to supply an output signal which is a function of the electrical control signal.

The invention also relates to a bistable device comprising the electrically controlled piezoresistor and a display device comprising at least one such electrically controlled piezoresistor.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
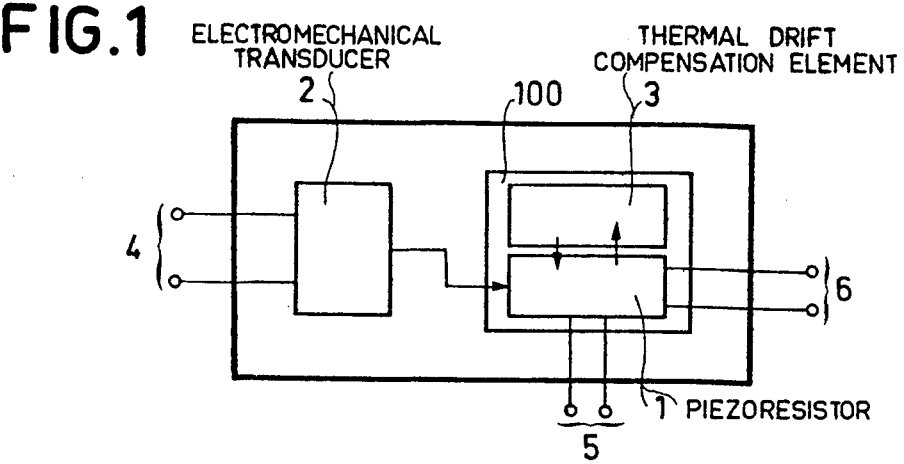
FIG. 1 diagrammatically the device according to the invention.

FIG. 1 diagrammatically shows the device according to the invention. The proposed device comprises a piezoresistor 1 mechanically coupled to an electromechanical transducer 2 which can be, for example, of an electromechanical conversion material, preferably of the piezoelectric polymer type. The piezoresistor is also preferably made from a conductive particle-charged polymer, the conductive particles being preferably of carbon or metal. An element 3 compensates the thermal drift due to the piezoresistor at the output terminals 6. Output terminals 6 can represent an electrical signal source, but also an optical signal source and in the latter case more specifically a modulator means is formed.

Thus, FIG. 1 represents a quadripole, whose input terminals 4 are of the electromechanical transducer and output terminals 6 of a circuit 100 incorporating the piezoresistive element. Terminals 5 are the supply terminals of the piezoresistive element. For example, this can be a d.c. or an a.c. voltage. In the case of an a.c. voltage it is thus possible to modulate the output signal.

Consideration will firstly be given to the coupling of the piezoresistive element and the electromechanical transducer, the latter being performed in an exemplified manner by a piezoelectric material element.

Figure 2:
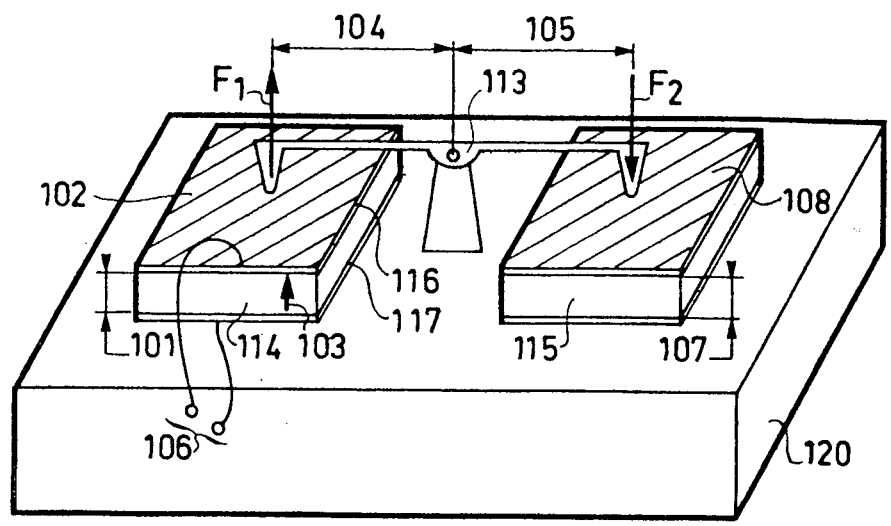

On referring to FIG. 2 in which 120 is a base, whereby for a piezoelectric polymer 114 $x_1$ is its relative deformation, $e_1$ its thickness (101), d its piezoelectric coefficient, $S_1$ its surface (102), $s_1$ its mechanical flexibility and $E_1$ and $X_1$ respectively the electrical field (103) and the mechanical stress applied, we obtain:

$$x_1 = dE_1 + s_1X_1 = \frac{\Delta e_1}{e_1} \tag{1}$$

For piezoresistor (115), with ($\Delta\rho/\rho$) the relative variation of the resistivity and $x_2$ its relative deformation, we obtain:

$$\frac{\Delta\rho}{\rho} = Kx_2 \tag{2}$$

$s_2$ its flexibility, $e_2$ its thickness (107), $X_2$ the mechanical stress applied and $S_2$ its surface (108)

$$x_2 = s_2X_2 = \frac{\Delta e_2}{e_2} \tag{3}$$

In order to adapt the mechanical impedance of the piezoelectric device to that of the piezoresistive device, it is possible to use a mechanical transformer 113 (e.g. a lever), which converts the displacement $\Delta e_1$ of piezoelectric device 114 into a displacement $\Delta e_2$ of the piezoresistive device 115, so that:

$$\Delta e_2 = n\Delta e_1 \tag{4}$$

The equilibrium of the forces $F_1$ and $F_2$ is written:

$$F_1 + nF_2 = 0 \tag{5}$$

n being the ratio of the lever arm lengths: $n=(l_2/l_1)$, with $l_1$ in 104 and $l_2$ in 105 in which $F_1=S_1X_1$ and $F_2=S_2X_2$.

The six aforementioned equations come down to a system of three equations making it possible to calculate $(\Delta\rho/\rho)$ as a function of $E_1$:

$$ne_1s_1X_1 - e_2s_2X_2 = -ne_1dE_1$$

$$Ks_2X_2 - \frac{\Delta\rho}{\rho} = 0$$

$$S_1X_1 + nS_2X_2 = 0$$

i.e.

$$\frac{\Delta\rho}{\rho} = -KdE_1 \frac{e_1}{e_2} \frac{n}{1 + n^2 \frac{e_1}{e_2} \frac{s_1}{s_2} \frac{S_2}{S_1}}$$

The mechanical adaptation is obtained for the value of n corresponding to the maximum of the function $(\Delta\rho/\rho)$ by cancelling out its derivative:

$$n^2 = \frac{e_2 s_2 S_1}{e_1 s_1 S_2}$$

leading to the values $(\Delta\rho/\rho)$ for the mechanical adaptation:

$$\frac{\Delta\rho}{\rho} = \frac{-KdE_1}{2} \left( \frac{e_1}{e_2} \frac{s_2}{s_1} \frac{S_1}{S_2} \right)^{\frac{1}{2}}$$

With a longitudinal piezoelectric effect, the field $E_1$(103) is applied in accordance with the thickness $e_1$ (101), i.e. $V_1 = e_1 E_1$. Voltage $V_1$ (106) is applied to the terminals of electrodes 116 and 117 deposited on the two faces of the piezoelectric $$\frac{\Delta\rho}{\rho} = -\frac{Kd_l}{2} V_1 \left( \frac{s_2 S_1}{e_1 e_2 s_1 S_2} \right)^{\frac{1}{2}}$$

Figure 3:
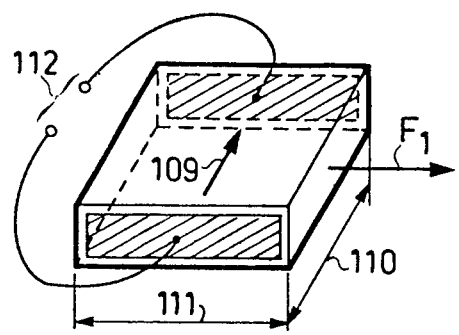
FIGS. 2 and 3 details the construction of the device.

In the transverse piezoelectric effect represented in FIG. 3, field $E_1$ (109) is applied in accordance with one of the dimensions $l_1$(110), $l'_1$(111); e.g. $l_1$ such that:

$$S_1 = l_1 l'_1 \text{ and } V_1 = l_1 E_1$$

The voltage $V_1$(112) is applied to the terminals of electrodes 118 and 119 deposited on the two faces of the piezoelectric $$\frac{\Delta\rho}{\rho} = -\frac{Kd_t}{2} V_1 \left( \frac{e_1 s_2 l'_1}{l_1 e_2 s_1 S_2} \right)^{\frac{1}{2}}$$

The piezoresistivity in the polymers is obtained by a filling or charging with conductive particles such as very small carbon or metal particles (a few hundred angstroems). The resistivity is then a function of the concentration of conductive particles and in particular varies very rapidly in the vicinity of a critical concentration constituting the percolation threshold.

Figure 4:
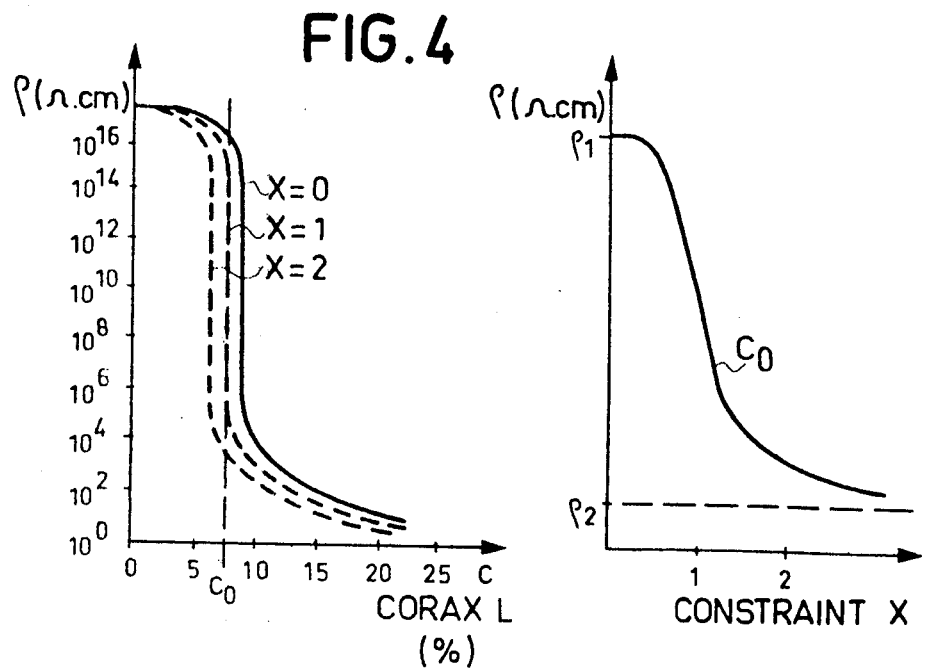
FIG. 4 explanatory drawings.

FIG. 4 shows on the one hand a diagram $\rho = f(c)$ which is a group of curves giving the shape of the resistivity variation $\rho$ of a polymer, as a function of the concentration c in carbon black CORAX L for various stress values in stress units. On the other hand, FIG. 4 gives the variation of the resistivity as a function of the stress $\rho = f(x)$ for a given concentration $c_o$ of carbon black CORAX L.

In the case of polypropylene (PP), the percolation threshold varies with the preparation conditions (from 3 to 13% CORAX L), but the relative variation slope $(\Delta\rho/\rho)$ in the vicinity of the threshold can be estimated as:

$$K_c = \left( \frac{1}{\rho} \frac{\Delta\rho}{\rho} \right)_{threshold} = -10^{10} \text{ to } -10^{14}$$

In a first approximation, this coefficient is proportional to the piezoresistive coefficient K used because to a relative variation of dimension $(\Delta e/e)$ corresponds an equal variation of volume $(\Delta v/v)$. The geometrical variations of this polymer are in fact blocked in the other directions. As the number of conductive particles is constant, the relative volume variation is proportional to the concentration variation $\Delta c$:

$$\frac{\Delta e}{e} = \frac{\Delta v}{v}$$

$c = (V_c/v)$ ($V_c$ being the volume of the carbon particles);

$$\Delta c = -\frac{V_c}{v} \cdot \frac{\Delta v}{v} = -c \frac{\Delta e}{e}$$

because:

$$\frac{\Delta\rho}{\rho} = K \frac{\Delta e}{e} \text{ and } \frac{\Delta\rho}{\rho} = K_c \Delta c \Longrightarrow K = -cK_c$$

so that with $c \simeq 0.1$, we obtain $10^9 < K < 10^{13}$.

Thus, consideration is given to $K = 10^{11}$ at the percolation threshold. A longitudinal configuration is obtained in which the piezoelectric polymer film 2 (PVF$_2$) is pressed against piezoresistive film 1 (PP-Corax) by a clip or by coating in a rigid material 7 in the manner shown in FIG. 5. Also shown are electrodes 8 and insulating film 9. On considering $S_1 = S_2$, $s_1 \simeq s_2$ and $e_1 = e_2 = 10 \ \mu m$, we then obtain with the ratio n equal to 1

$$\frac{\Delta\rho}{\rho} = -\frac{K}{2} dN_1 \left( \frac{1}{e_1 e_2} \right)^{\frac{1}{2}}$$

For PVF$_2$ there is a piezoelectric coefficient $d = d_{33} = 15.10^{12} CN^{-1}$, so that $V_1 = 5$ volts for example:

$$\left| \frac{\Delta\rho}{\rho} \right| \simeq 3.10^5$$

This relative variation is considerable, but probably cannot be used in actual practice.

Thus, in the previous example, the relative thickness variation resulting from the piezoelectric effect is $$\frac{\Delta e_2}{e_2} = \frac{d_{N_1}}{2}\left(\frac{1}{e_1 e_2}\right)^{\frac{1}{2}} = 3.10^6$$

However, in actual fact, the expansion coefficients of polymers are close to $10^{-4}$, so that a temperature variation of $3.10^{-2}$ degrees has the same effect on $(\Delta\rho/\rho)$ as the application of voltage $V_1$. Unless the temperature of the device is quickly stabilized, it is necessary to be satisfied with a lower piezoresistive coefficient. Even in this case, it is necessary to compensate the thermal drift.

To this end, it is possible to envisage a differential structure comprising two piezoresistors, whereof only one is subject to the deformation caused by the piezoelectric or whereof both are subject to opposing stresses. This explains the presence of the thermal drift compensator 3 in FIG. 1.

Figure 6:
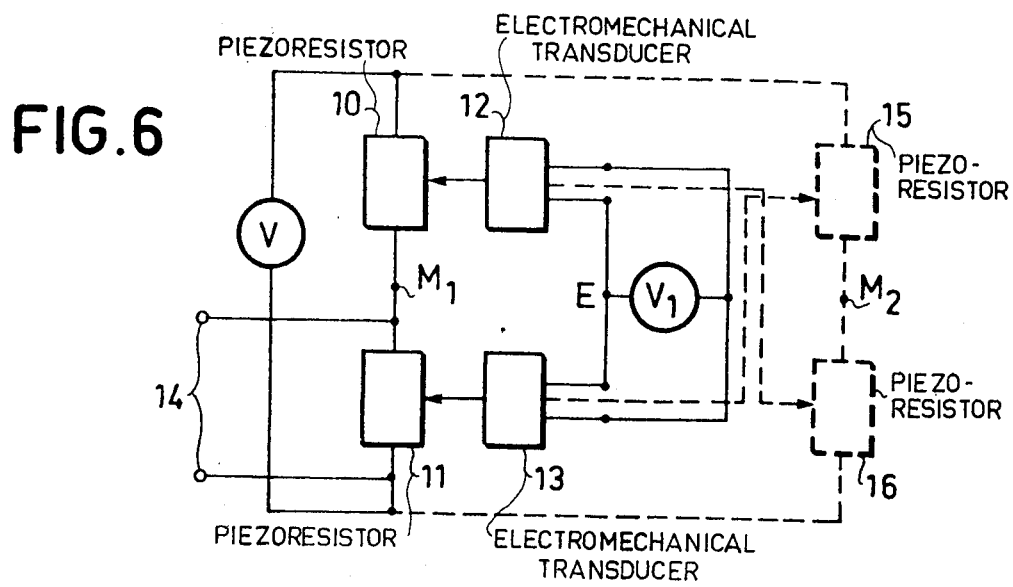
FIGS. 6 and 7 is a construction of the device according to the invention.

One type of possible circuit is shown in FIG. 6. Two series-mounted piezoresistive elements 10, 11 are excited in opposition by two electromechanical transducers 12 and 13, giving two resistance variations $+\Delta R$ and $-\Delta R$.

Thus, an amplifier circuit is obtained, whose output voltage is equal to $V_s = (V/2) + GV_1$. By limiting the piezoresistive coefficient to approximately $10^6$ (use of PVC instead of PP) the relative variation $(\Delta\rho/\rho)$ in the example considered hereinbefore is 0.6 per volt applied, so that the gain of the circuit is then e.g. $G=30$ for $V=100$ volts.

It would be possible to consider a circuit only having, for example, a single transducer 12, which excites one of the piezoresistive elements 10, the other 11 not being excited.

Another variant would be to consider a "bridge" arrangement or circuit, two branches having piezoresistive elements such as branches 10 and 11, an additional branch being indicated by dotted lines in FIG. 6. The output signal is obtained between the center points $M_1$ and $M_2$ of said two branches. One of the transducers 12 exciting the piezoresistive elements 10 and 16 and the other 13 excites the piezoresistive elements 11 and 15 to respectively obtain variations $+\Delta R$ and $-\Delta R$, so that the aforementioned effect can be doubled.

Figure 5:
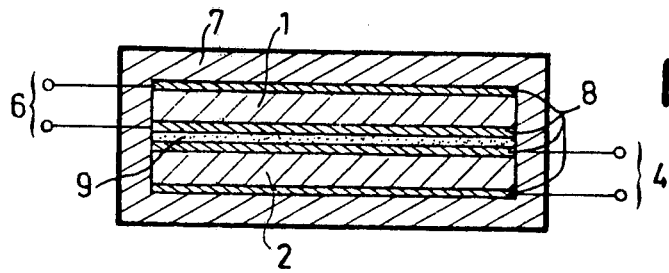
FIG. 5 is a partial construction of a device according to the invention.
Figure 7:
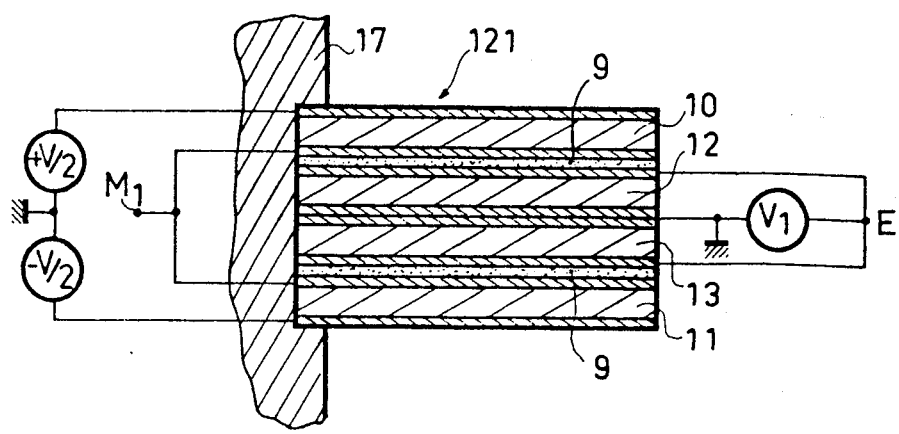

It is then possible to produce the first variant of the circuit according to FIG. 4 by using two joined structures like that described in FIG. 5 by considering the electromechanical transducers as piezoelectric elements. FIG. 7 is then obtained in which the references of FIG. 6 are again used. Thus, a piezoelectric bimorph is obtained having two piezoresistive films 10, 11. One of the sides of this bimorph can be fixed by securing it in a recess 17. Thus, when voltage $V_1$ which can, for example, be broken down into two voltages $+V_{/2}$ and $-V_{/2}$ applied on either side of earth is applied to the piezoelectric films 12 and 13, e.g. of $PVF_2$, the bimorph bends leading respectively to an extension and a compression in the piezoresistive films 10, 11. On considering face 121 of the bimorph, the latter can be used as a display element, the outer electrode constituting a mobile mirror.

Figure 8:
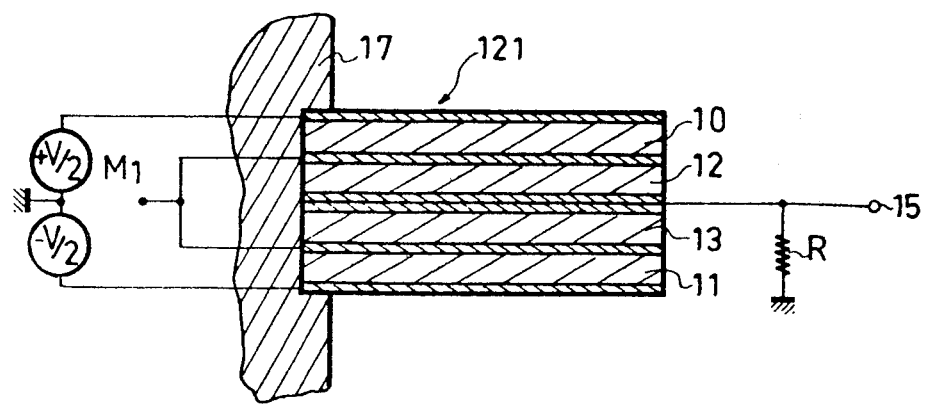
FIGS. 8 and 9 shows applications of the device according to the invention.

This element can be made bistable by reinjecting all or part of the output voltage of the input. This makes it possible to simplify the structure of FIG. 7 by eliminating insulating films 9, which in fact amounts to the connection of points E and $M_1$ of FIG. 7. The structure of FIG. 8 is then obtained. The potential at point $M_1$, the output of the bistable device, can occupy two states which are values close to $+V_{/2}$ and $-V_{/2}$, but which are lower in absolute value. These states are stable due to the relooping between the input and output. A low resistance value on piezoresistor 10 and a high resistance value on piezoresistor 11 corresponds to the first stable state with the potential of $M_1$ close to $+V_{/2}$. These resistance values are obtained on curve $\rho = f(x)$ in FIG. 4 from the values $\rho_1$ and $\rho_2$ of $\rho$. These resistance values are due to the application of equal voltages of opposite directions at the terminals of piezoelectric films 12 and 13, resistance R introduced and permitting a return to earth. By applying a positive pulse at input point 15, it is then possible to invert the voltages at the terminals of the piezoelectric films for an amplitude value above the operating threshold, whose amplitude is linked with the piezoelectric films and the resistance value R. The bistable device is then switched into its second stable state, which corresponds to a high resistance value of piezoresistive film 10 and a low resistance value of piezoresistive film 11 and consequently with a potential at $M_1$ close to $-V_{/2}$. By then applying a negative pulse with an amplitude exceeding the operating threshold it is possible to return to the first state.

Figure 9:
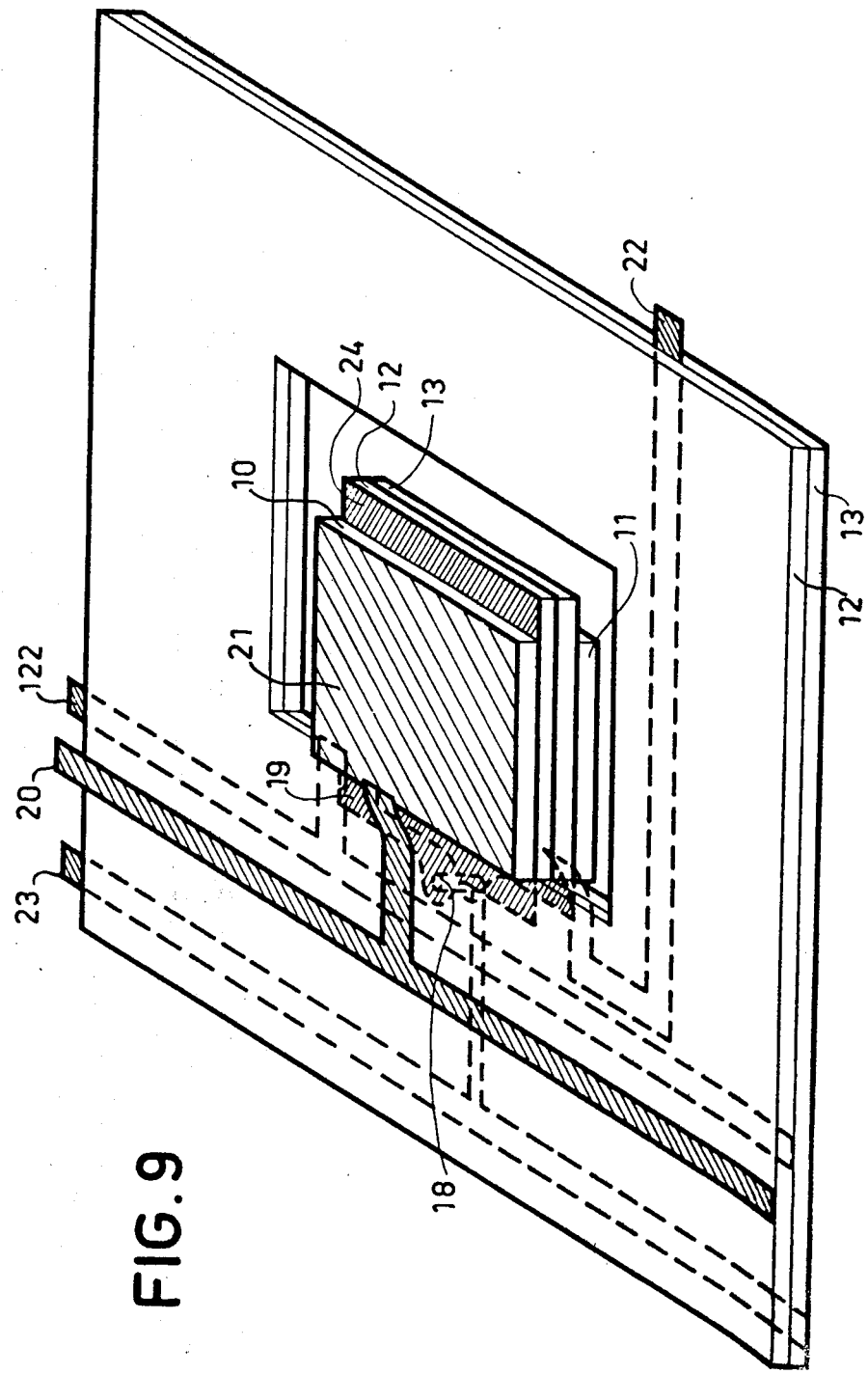

This very simple structure can be extended to a matrix of bistable devices, thus constituting a display panel. It is then possible either to use the bimorphs in mobile mirrors, the electrode of face 121 then serving as a mobile mirror, or the centre point $M_1$ of the piezoresistors, whose potential has a value close to $+V_{/2}$ or $=V_{/2}$, whereby it is used for controlling the actual display which can be obtained by means of e.g. liquid crystals. The substrate of the switching matrix is formed by two adhered $PVF_2$ films. The local deposits of piezoresistive films can be obtained by solution coating and solvent evaporation. The electrodes can be deposited by evaporation. The switching elements can then be cut by means of a punch on three sides, the uncut side serving as a hinge. This construction is illustrated in FIG. 9, which is a view of the bistable element of FIG. 8. The upper piezoelectric film 12 and lower piezoelectric film 13 are joined to one another by adhesion. On the upper film, it is possible to see the piezoresistive deposit 10 and electrodes 21 and 24 on either side of the piezoresistor. The upper electrode is connected to the column electrode 20 and the lower electrode is connected to its homolog on the lower film via a hole 18 having a metallized wall. On the lower film, it is possible to see the electrode arrangement connected to the line electrode 22. A metal coating 19 is shown at the interface between the piezoresistive device and the piezoelectric device and it is connected to the column electrode 122.

The electromechanical transducers can be produced by means of a piezoelectric material, but obviously any other type of transducer can be used.

The interest of working in the percolation threshold zone is that one is then in a linear area of the resistivity curve as a function of the stress. As shown hereinbefore, the more marked this threshold, the greater the relative variation of the resistivity for a low stress variation, so that high gains can be obtained and in the case of a bistable arrangement a clearly defined switching threshold.

Hitherto, consideration has been given to the use of the device according to the invention in amplifier circuits and in bistable circuits, but it is also possible to use it in any circuit or arrangement where it is advantageous to employ a quadripole, e.g. in oscillators. It can then compensate a thermal drift by retaining a very stable frequency.

The piezoresistive elements can be exposed to stresses perpendicular to their large faces, but they can also be exposed to stresses parallel to said faces. For example, it is then possible to produce electrodes by surface deposition of a piezoresistive film, said electrodes defining the piezoresistive elements in a transverse manner.

Thus, this constraint represents a stretching of the film, which has a directional response by the Poisson effect. On considering the length l and the width a of the piezoresistive film, we obtain:

$$\frac{\Delta a}{a} = -\sigma \frac{\Delta l}{l}$$

with $\sigma$ being the Poisson coefficient. Thus, $\sigma$ is the ratio of the relative contraction to the relative elongation.

Figure 10:
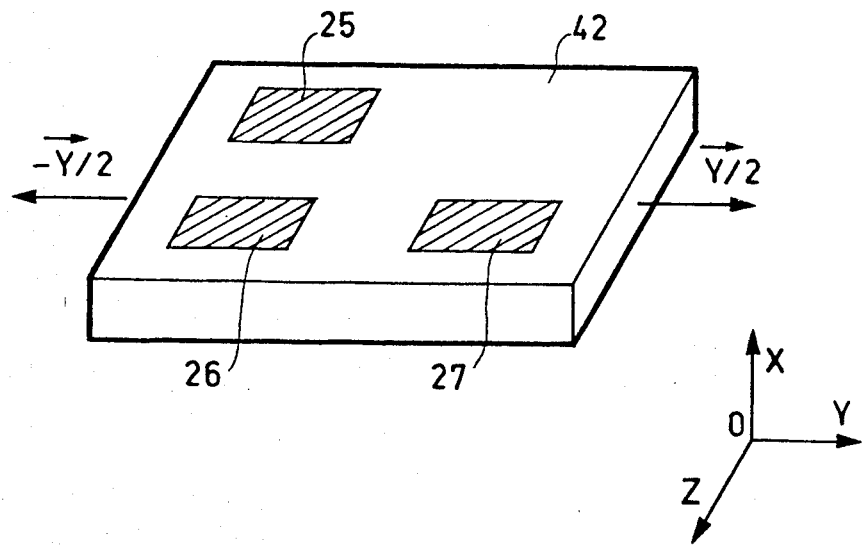
FIGS. 10 to 14 are constructional variants of the device according to the invention.

Thus, on considering a piezoresistive film 42 subject to an elongation $\overline{Y}$ as shown in FIG. 10 in the direction of axis OY, we obtain an elongation and as a direction of OZ a contraction. Thus, between electrodes 25 and 26 and between electrodes 26 and 27, the resistance values vary in opposite directions. Consideration can then be given to the circuits described hereinbefore and in particular in FIG. 6.

Figure 11:
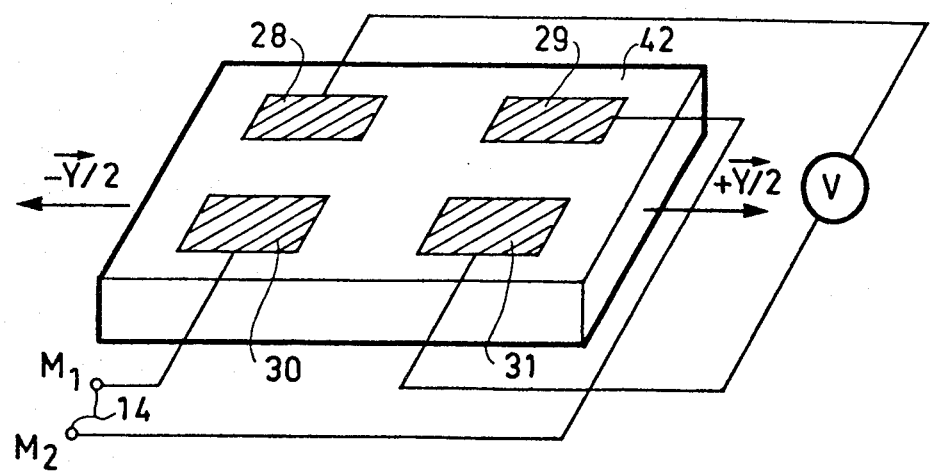

Thus, the bridge arrangement of circuit of FIG. 6 can be produced with four piezoresistors 10, 11, 15, 16 by considering the four electrodes 28, 29, 30, 31 disposed in the manner shown in FIG. 11. Thus, the differential piezoresistors are positioned between the electrodes and in accordance with the information given in FIG. 6 points M$_1$ and M$_2$ are obtained.

Figure 12:
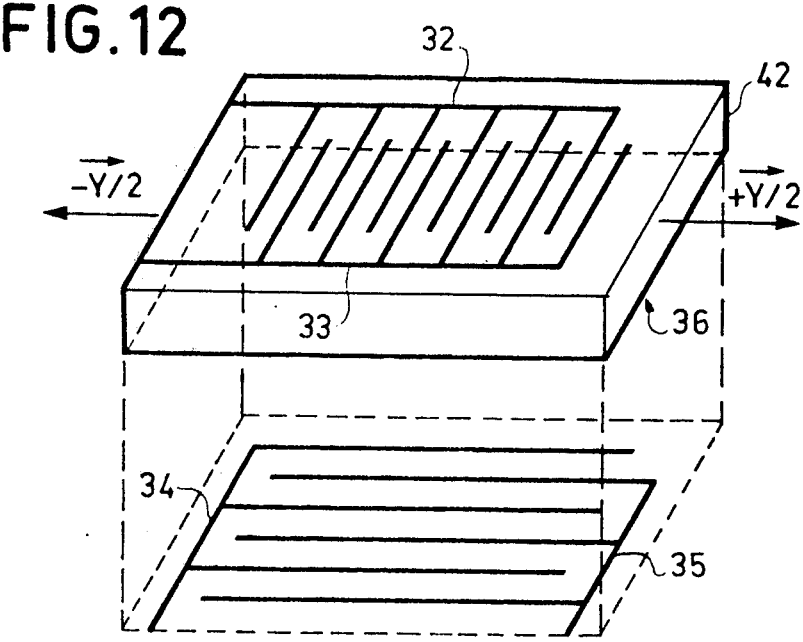

It can be of interest to work with electrodes deposited on the surface in the form of interdigitated transducers on the two faces of a piezoresistor film 42 in two perpendicular directions in order more easily to obtain certain resistance values. These electrodes in the form of interdigitated transducers make it possible to retain an orientation of the effects, to use a limited spacing between the transducers to obtain low resistance values and to work in two surface areas on either side of the thin film. Thus, it is possible to work with a transducer on each face of the film, the two transducers being disconnected from one another. Thus, in FIG. 12, there are resistances varying in inverse manner by the Poisson effect respectively between electrodes 32, 33 and 34, 35, the lower face being shown at 36. Thus, consideration can be given to the aforementioned circuits, particularly that of FIG. 6.

Figure 13:
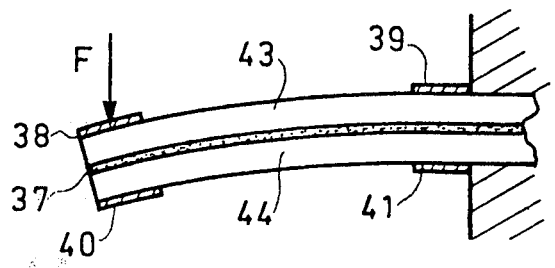

Another circuit for obtaining two resistances which vary in an inverse manner consists of bending an element made from two piezoresistive films 43, 44 separated by an insulating film 27 in the manner shown in FIG. 13. Two electrodes are arranged on the surface of each of these films. On bending, film 43 undergoes an elongation and film 44 a contraction. Thus, the piezoresistors respectively between electrodes 38, 39 and 40, 41 vary in opposite directions.

Figure 14:
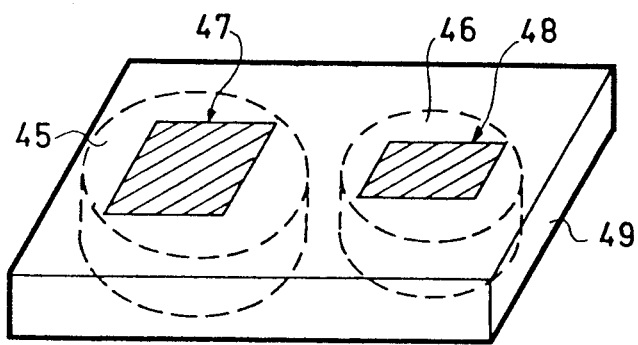

Thus, in the case of stretching, it is possible to consider an electromechanical transducer produced by means of a piezoelectric element. As illustrated in FIG. 14, it is possible to produce a film 49 having both a piezoresistive element 45 and a piezoelectric element 46 by considering two materials of substantially equal viscosities at the time of casting, based e.g. on PVF$_2$. Electrodes 47 and 48 can then be deposited on the surface of the film. Piezoresistive element 45 and piezoelectric element 46 have been diagrammatically represented by two dotted-line cylindrical volumes. This makes it possible to produce the aforementioned circuits in integrated manner on a single film with a transducer produced with a piezoelectric element.

What is claimed is:

1. An electrically controlled piezoresistor comprising at least one piezoresistive element made from a conductive particle-charged dielectric material and having one percolation point and a pair of input terminals, and at least one electromechanical transducer connected at its input terminals to an electrical control signal and acting on said piezoresistive element via a transmitter element made from a dielectric material, means for compensating the thermal drift due to the piezoresistive element cooperating to supply an output signal which is a function of the electrical control signal.

2. A piezoresistor according to claim 1, wherein said means for compensating thermal drift comprises a second piezoresistive element connected in a differential circuit arrangement with said first piezoresistive element.

3. A piezoresistor according to claim 1, wherein the piezoresistive element is made in the form of a film.

4. A piezoresistor according to claim 1, wherein the electromechanical transducer is a piezoelectric element.

5. A piezoresistor according to claim 4, wherein the piezoelectric element is in the form of a film.

6. A piezoresistor according to claim 5, wherein the piezoresistive and piezoelectric elements further include control electrodes and wherein said elements, as well as their control electrodes, are arranged in the form of superimposed layers.

7. A piezoresistor according to claim 6, wherein two piezoresistive elements and two piezoelectric elements are arranged in the form of superimposed layers.

8. A piezoresistor according to claim 1, wherein the control electrodes of the piezoresistive elements produced in the form of a film are obtained by deposition on the surface of the film.

9. A piezoresistor according to claim 8, wherein the control electrodes of the piezoresistive elements are deposited on the same face of the film.

10. The piezoresistor according to claim 8, wherein the control electrodes of the piezoresistive elements are deposited on each of the faces of the film.

11. A piezoresistor according to claim 10, wherein the control electrodes are in the form of interdigitated transducers deposited on either side of the piezoresistive film and in two perpendicular directions.

12. A piezoresistor according to claim 9, wherein the electromechanical transducer in the form of a piezoelectric element is produced in the same film as the piezoresistive element which is of the same type as the piezoelectric element and is charged with conductive particles.

13. A piezoelectric device according to claim 7, wherein said two piezoelectric films are positioned on either side of a central electrode connected to the input and grounded by means of a resistor, and further comprising two electrodes deposited on either side of said piezoelectric film with said two electrodes being interconnected at a point forming the output with said piezoeresistive films and their respective external electrodes successively deposited on the outer faces of said two electrodes and wherein each of said external electrodes is connected to a generator with the voltage of one of said connected generators being equal in value but opposite in phase to the voltage of the other of said connected generators.

* * * * *